United States Patent [19]

Sway

[11] 3,921,801

[45] Nov. 25, 1975

[54] SELF-CONTAINED MOLDING KIT FOR HEAT-LIQUIFIABLE MOLDING MATERIAL

[76] Inventor: Boris Sway, 7201 W. Aracoma Drive, Cincinnati, Ohio 45237

[22] Filed: Jan. 30, 1975

[21] Appl. No.: 545,365

[52] U.S. Cl. .............. 206/223; 206/457; 206/508; 220/256; 220/376; 249/104; 249/121; 425/DIG. 57
[51] Int. Cl.² ................... B28B 7/00; B65D 69/00
[58] Field of Search .......... 46/1 R, 16; 206/84, 216, 206/219, 223, 457, 499, 503, 508, 515; 220/23, 256, 376; 264/245, 299, 319; 249/104, 121, 204, 334, DIG. 1; 425/DIG. 57; D7/43

[56] References Cited
UNITED STATES PATENTS

| | | | |
|---|---|---|---|
| 2,235,964 | 3/1941 | Meyer et al. | 249/104 X |
| 2,693,307 | 11/1954 | Goodwin | 206/508 X |
| 2,997,788 | 8/1961 | Gilbert | 206/457 X |
| 3,128,725 | 4/1964 | Becker et al. | 249/121 X |
| 3,385,503 | 5/1968 | Stump | 206/223 X |
| 3,680,828 | 8/1972 | Swett | 249/121 X |
| 3,799,493 | 3/1974 | Beck et al. | 249/121 X |

*Primary Examiner*—William I. Price
*Assistant Examiner*—Steven E. Lipman
*Attorney, Agent, or Firm*—J. Warren Kinney, Jr.

[57] ABSTRACT

A self-contained molding kit for heat-liquifiable molding material includes a container for molding material and a combination closure member mold which is releasably secured to and carried by the container.

8 Claims, 21 Drawing Figures

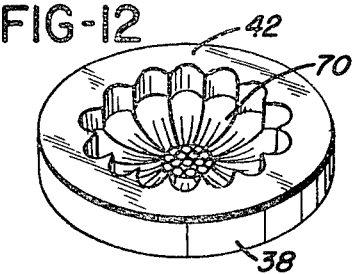
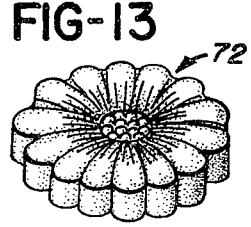
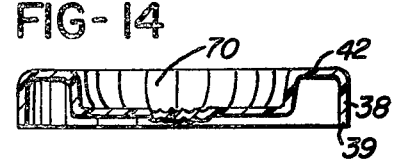
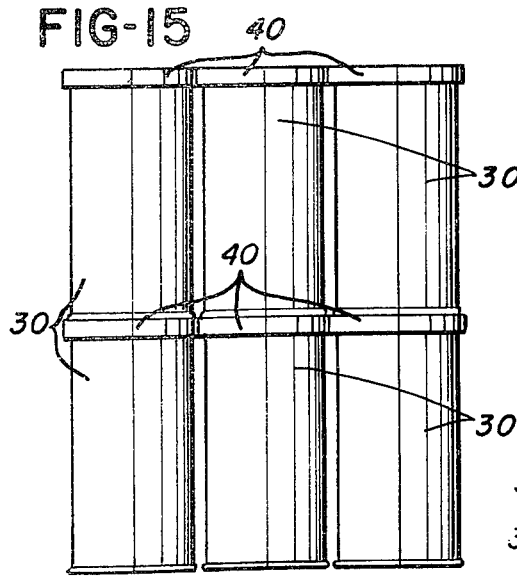
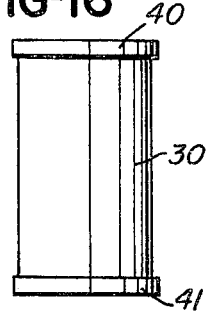
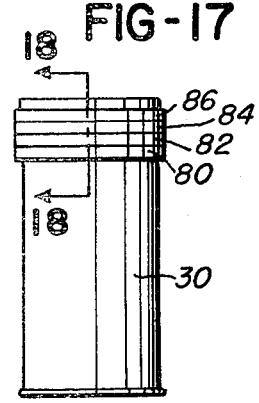
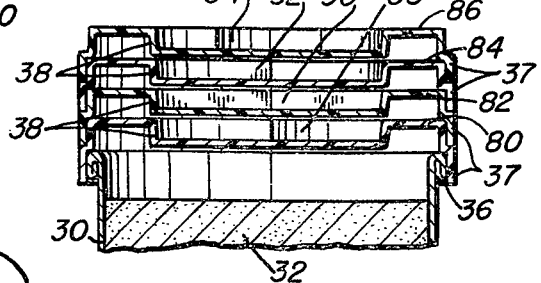
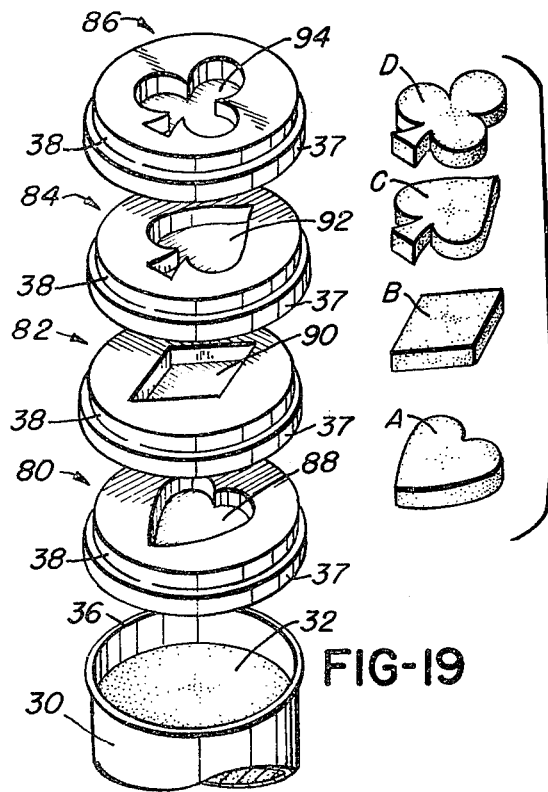
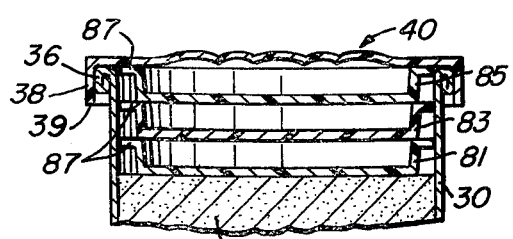

SELF-CONTAINED MOLDING KIT FOR HEAT-LIQUIFIABLE MOLDING MATERIAL

BACKGROUND OF THE INVENTION

1. Field of the Invention

The invention relates to a self-contained molding kit which comprises a container in which a quantity of heat-liquifiable material, such as, by way of example, soap, is housed and sealed within the container by a removable closure member which when removed from the container and inverted serves as a mold into which the heat-liquifiable material may be poured and then permitted to set for producing a wafer-like token, one surface of which contains indicia, in relief, which is the mirror-image of the mold-surface of the closure member.

In the preferred embodiment of the invention the heat-liquifiable material comprises a soap product which melts at low temperatures of 120°–130°F. so as to prevent a person from being burned by the heat-liquified material in the event that it should be accidently or unintentionally spilled onto the skin of a person or child during a token-casting operation.

2. Description of the Prior Art

U.S. Pat. No. 3,680,828 discloses a mold for congealable comestibles which comprises a central mold portion 11 having an open, upper end defined by a peripheral circular flange 13, and an open, lower end defined by a downwardly extending peripheral flange 15. Each of the open ends are adapted to be closed by means of closure members 16 and 17 which are removably attached to the aforesaid peripheral flanges. One of the closure members is provided with a design depressed therein for imparting a copy of said design to the adjacent surface of the congealed comestible in contact therewith as a result of filling the central mold portion 11 when the entire assembly has been inverted to be supported on and by the said closure member. After the material has congealed the mold assembly is turned over for disposing the said closure member uppermost.

U.S. Pat. No. 3,799,493 also discloses a central housing 10, open at opposite ends, and having removable closure members engaging the peripheral lips of said opposite ends, wherein one of said closure members is contoured to imprint a design on the surface of the congealed contents of the housing.

U.S. Pat. No. 261,156 discloses a soap tablet, the upper surface of which is provided with an outwardly projecting contour of an object which is an integral part of the soap tablet.

U.S. Pat. No. 2,505,947 discloses a tray for making ice cubes of various shapes and designs from water which is frozen in cavities of the tray.

U.S. Pat. No. 2,423,435 discloses a method of making a soap cake having an insignia or design in the form of inserts of soap suitably colored to contrast with and which are embedded in and extend completely through the soap cake.

U.S. Pat. No. 1,791,359 discloses a cake of soap 10 having a block insert of soap 13 of contrasting color disposed within an opening provided through cake 10 so that as the cake 10 wears down from use the insert material will be ever present.

SUMMARY OF THE INVENTION

The subject invention relates to a self-contained kit which contains a low heat-liquifiable molding material and mold for enabling wafer-like tokens to be cast without requiring the use of additional or special equipment, and wherein the kit is safe for use by children by reason of the low melting point of the casting material, which, in the preferred embodiment of the invention is a bland, non-toxic soap.

BRIEF DESCRIPTION OF THE DRAWINGS

FIG. 12 is a perspective view of the top of a modified mold.

FIG. 13 is a perspective view of a wafer-like token produced from the mold of FIG. 12.

FIG. 14 is a vertical sectional view through FIG. 12.

FIG. 15 is a side view of a plurality of kits of FIG. 1 in stacked relationship.

FIG. 16 is a side view of a kit having molds attached to the top and bottom ends of the container.

FIG. 17 is a side view of a kit having a plurality of molds disposed in nested relationship.

FIG. 18 is a sectional view of lines 18—18 of FIG. 17.

FIG. 19 is a perspective view of the open top portion of a container illustrating the moldable material therein.

FIG. 20 is a perspective view of a plurality of molds of FIG. 18, but in a separated relationship illustrating the waferlike tokens produced from each of said molds.

FIG. 21 is a vertical sectional view similar to FIG. 18 illustrating a plurality of molds which are receivable within the interior of the container.

DESCRIPTION OF THE PREFERRED EMBODIMENTS

Figure 1:
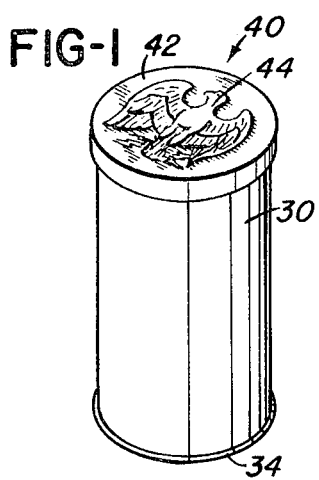
FIG. 1 is a perspective view of a kit embodying the teachings of the present invention.
Figure 2:
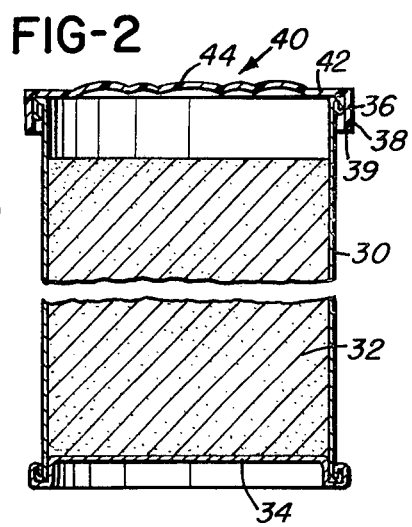
FIG. 2 is a vertical sectional view of FIG. 1.
Figure 3:
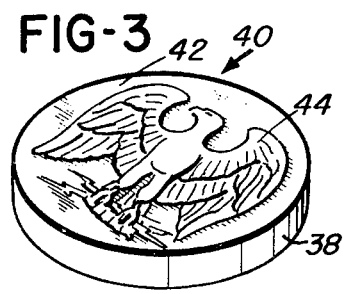
FIG. 3 is a perspective view of the upper surface of the mold-closure member of FIG. 1.
Figure 4:
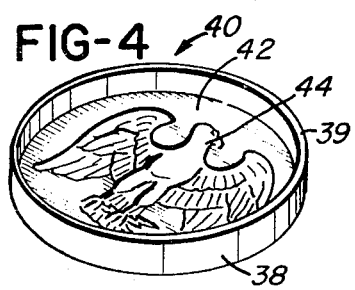
FIG. 4 is a view similar to FIG. 3 of the inner surface thereof.

With particular reference to FIGS. 1 and 2, it will be noted that the subject kit comprises an elongate, substantially cylindrical container 30 which has a quantity of moldable, heat-liquifiable material 32 housed therein. A closure member 34 permanently closes the lower end of the container, the upper open end of which is defined by an outwardly rolled bead 36, or the like, which is securely, though releasably, engaged by the depending side walls 38 of a closure-member-mold 40, which includes a central portion 42 which is embossed or otherwise provided with insignia, such as, by way of example, an eagle 44. In the preferred embodiment of the invention, uniformly satisfactory results have been obtained in those instances in which the moldable, heat-liquifiable material 32 comprises a soap product which is bland, non-toxic and which has a melting point in the range of 120°–130°F. and which, upon cooling, provides a hardness sufficient to enable the token-wafer cast therefor to be handled without destroying or obliterating the indicia thereon.

The formulation of a soap which has given excellent results comprises:

|  | By Weight |
| --- | --- |
| Stearic Acid | 11.0% |
| Coconut Oil | 15.0 |
| Tall Oil Acid | 4.0 |
| Caustic Soda 50% | 9.6 |
| Glycerine | 23.6 |
| Propylene Glycol | 15.0 |
| Water | 21.8 |
|  | 100.0% |

A quantity of the aforesaid moldable material 32 is poured into container 30 where it readily hardens after which the closure-mold-member 40 is applied to the free open end of the container for thereby providing the completed kit as illustrated in FIG. 1.

Figure 5:
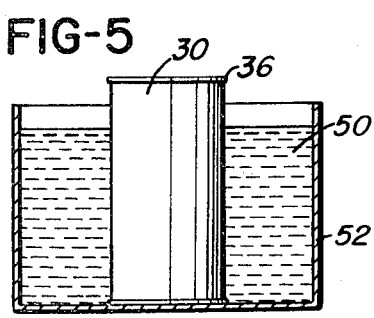
FIG. 5 is a side view, partly in section, illustrating the manner in which the moldable material is liquified.
Figure 6:
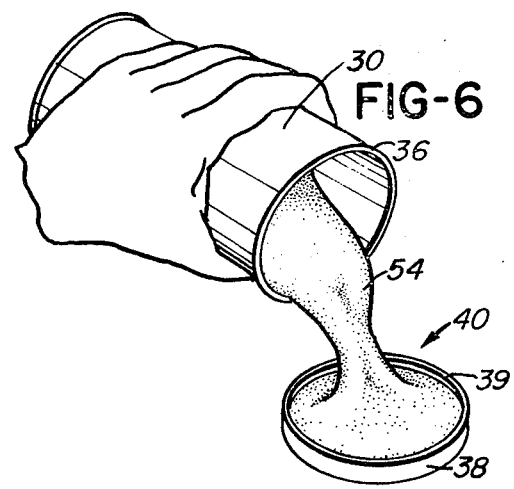
FIG. 6 is a perspective view illustrating the manner in which the heat-liquifiable molding material is introduced into a mold.
Figure 7:
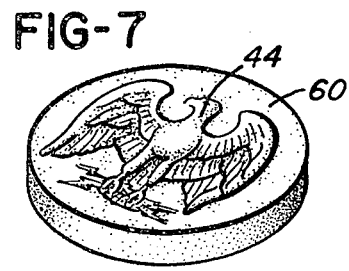
FIG. 7 is a perspective view of a wafer-like token as produced from the mold of FIGS. 3–4.

When it is desired to utilize the kit for casting token like wafers, the closure-mold-member 40 is removed from the upper end of the container after which the container is immersed in warm water at 130°F. as indicated by the numeral 50 housed with a receptacle, wash basin, or the like, 52, until such time as the contents of the container has been liquified to a pourable consistency, as indicated by the numeral 54, of FIG. 5. The heat-liquified moldable material is poured into the closure-mold-member 40, and after the mold has been substantially filled to the level indicated by peripheral edges 39 thereof, it may be set aside and within a short time thereafter the moldable material will have hardened after which it may be removed from the mold for providing a wafer-like token 60 such as illustrated in FIG. 7, having the indicia 44 prominently displayed on the upper surface thereof.

Figure 8:
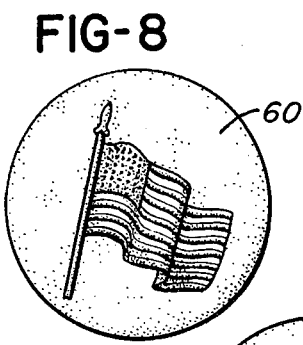
FIGS. 8–11 are perspective views of other designs of wafer-like tokens.
Figure 9:
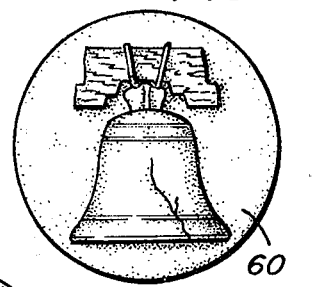
Figure 10:
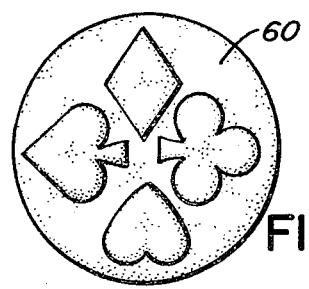
Figure 11:

FIGS. 8, 9, 10, and 11 illustrate wafer-like tokens 60, the upper surface of which have been provided with different forms of indicia, such as, by way of example, a flag in FIG. 8; a liberty bell in FIG. 9; hearts, spades, diamonds and clubs in FIG. 10; and a replica of the White House in FIG. 11.

FIGS. 12 and 14 illustrate a modified form of a closure member mold wherein the central portion of said member is rather deeply recessed as at 70 for providing a mold from which a token-like wafer resembling a flower 72, FIG. 13, may be cast.

FIG. 15 illustrates the manner in which a plurality of kits of FIG. 1 may be stacked for storage.

FIG. 16 illustrates a container 30 having a first closure member mold 40 securely, though releasably, associated with the free upper end of the container, as in FIGS. 1 and 2 and wherein a second mold 41 is releasably secured to and carried by the lower end of the container, thereby providing the user of the device with a pair of molds, each of which are secured to the container, per se, whereby to provide a kit free of loose parts.

In FIGS. 17 and 18 I have illustrated a container 30, the upper end of which is provided with four vertically nested mold members, each of which include a depending lip 38 which is adapted to engage either bead 36 of container 30 or the upstanding, offset wall 37 of another of the molds 80, 82, and 84. Each of said molds is provided with a central, depressed token defining cavity 88, 90, 92, and 94, respectively, which cavities, as illustrated in FIG. 19, represent, by way of example, a heart A, diamond B, spade C, and club D, respectively, of molds 80–86.

It will be noted that the tokens A, B, C and D as obtainable from molds 80, 82, 84, and 86 are free of any material beyond the outer confines of the molded tokens, per se, of the indicia designated by the molded product.

In FIG. 21 I have illustrated a modification of the structure of FIG. 18, wherein molds 81, 83, and 85 each include an upper peripheral edge 87 which is receivable within the interior of container 30 and wherein the uppermost mold 87 is similar to mold 40 of FIGS. 1 and 2 in that it terminates in a downwardly extending wall 38 which engages the uppermost bead of container 30.

Mold 87 maintains each of molds 81, 83, and 85 in their nested relationship within the container, as illustrated.

From the foregoing, it will be noted that I have thus provided a kit in the form of a container for a heat-liquifiable molding material and one or more molds into which the heat-liquified molding material may be poured for producing a wafer-like token having an indicia in bas-relief.

What is claimed is:

1. A molding kit comprising a substantially cylindrical, elongate container open at one end and closed at its other end, a quantity of heat-liquifiable molding material housed within said container, and a closure member securely, though releasably, secured to the free open end of the container for enclosing the contents thereof, said closure member having peripheral side walls which project outwardly from and completely circumscribe a central portion having indicia embossed therein, said container fabricated from material adapted to withstand the application of heat sufficient to liquify the molding material in the container, said closure member when removed from the container and inverted defining a mold adapted to receive and contain the heat-liquified molding material from the container for providing a mirror-image of the indicia of the mold, which image is reproduced in said material as it cools and hardens in the mold.

2. A molding kit as called for in claim 1, wherein the heat-liquifiable molding material comprises a soap having a melting point sufficiently low to preclude inflicting a burn if accidentally spilled onto the bare skin of a person, and which upon cooling hardens to permit handling without distortion.

3. A kit as called for in claim 2, wherein the soap has a melting point in the neighborhood of 120°–130°F.

4. A kit as called for in claim 1, wherein the container is fabricated from material adapted to withstand prolonged and repeated immersion in a liquid bath of a temperature sufficient to liquify the molding material in the container.

5. A kit as called for in claim 1, wherein a second closed member, having peripheral side walls which project outwardly from and completely circumscribe a central portion having indicia embossed therein, is removably secured to and carried by the closed end of the container, said closure member defining a mold adapted to receive and contain the heat-liquified contents from the container for providing a mirror-image of the indicia of the mold, which image is reproduced in said material as it cools and hardens in the mold.

6. A kit as called for in claim 1, wherein a plurality of individual molds, each having peripheral side walls which project outwardly from and completely circumscribe a central portion having indicia embossed therein, are provided in nested relationship, and wherein the bottommost mold is releasably secured to and carried by the said closure member.

7. A kit as called for in claim 1, wherein one or more individual molds, each of which have peripheral side walls which project outwardly from and completely circumscribe a central portion having indicia embossed therein, are provided interiorly of the container between the upper surface of the molding material housed therein and the said closure member.

8. A kit as called for in claim 1, wherein the closure member is adapted to be securely, though releasably, resecured to the free open end of the container for enclosing the molding material remaining therein after a molding operation has been completed.

* * * * *